US011674206B2

United States Patent
Kubota et al.

(10) Patent No.: US 11,674,206 B2
(45) Date of Patent: Jun. 13, 2023

(54) SINTERED FRICTION MATERIAL FOR RAILWAY VEHICLES AND METHOD FOR PRODUCING THE SAME

(71) Applicants: NIPPON STEEL CORPORATION, Tokyo (JP); FINE SINTER CO., LTD., Kasugai (JP)

(72) Inventors: Manabu Kubota, Tokyo (JP); Kazutaka Asabe, Tokyo (JP); Yuki Ichikawa, Tokyo (JP); Takeshi Nakano, Kasugai (JP); Tokitake Okahira, Kasugai (JP); Isao Shimazoe, Kasugai (JP)

(73) Assignees: NIPPON STEEL CORPORATION, Tokyo (JP); FINE SINTER CO., LTD., Kasugai (JP)

( * ) Notice: Subject to any disclaimer, the term of this patent is extended or adjusted under 35 U.S.C. 154(b) by 281 days.

(21) Appl. No.: 16/463,878

(22) PCT Filed: Nov. 30, 2017

(86) PCT No.: PCT/JP2017/043148
§ 371 (c)(1),
(2) Date: May 24, 2019

(87) PCT Pub. No.: WO2018/101435
PCT Pub. Date: Jun. 7, 2018

(65) Prior Publication Data
US 2019/0292634 A1    Sep. 26, 2019

(30) Foreign Application Priority Data
Dec. 1, 2016   (JP) .............................. JP2016-234504

(51) Int. Cl.
C22C 32/00   (2006.01)
C22C 1/05    (2023.01)
C22C 9/00    (2006.01)

(52) U.S. Cl.
CPC ............ *C22C 32/0084* (2013.01); *C22C 1/05* (2013.01); *C22C 9/00* (2013.01)

(58) Field of Classification Search
CPC ......... C22C 32/0084; C22C 1/05; C22C 9/00; C22C 1/0425; C22C 32/0005;
(Continued)

(56) References Cited

U.S. PATENT DOCUMENTS 3,428,440 A    2/1969  Roth
5,824,923 A *  10/1998 Kondoh .............. C22C 32/0089
                                                      75/247

(Continued)

FOREIGN PATENT DOCUMENTS

CN    102676871 A    9/2012
JP       586359 A    4/1993
(Continued)

*Primary Examiner* — John A Hevey
(74) *Attorney, Agent, or Firm* — Greer, Burns & Crain, Ltd.

(57) ABSTRACT

There is provided a sintered friction material for railway vehicles that has excellent frictional properties and wear resistance even in a high speed range of 280 km/hour or more. The sintered friction material for railway vehicles is a green compact sintered material containing, in mass %, Cu: 50.0 to 75.0%, graphite: 5.0 to 15.0%, one or more selected from the group consisting of magnesia, zircon sand, silica, zirconia, mullite, and silicon nitride: 1.5 to 15.0%, one or more selected from the group consisting of W and Mo: 3.0 to 30.0%, and one or more selected from the group consist-
(Continued)

ing of ferrochromium, ferrotungsten, ferromolybdenum, and stainless steel: 2.0 to 20.0%, with the balance being impurities.

6 Claims, 2 Drawing Sheets

(58) Field of Classification Search
CPC ............. C22C 32/0021; C22C 32/0047; F16D 2200/0073; F16D 69/027; B22F 3/02; B22F 3/14
See application file for complete search history.

(56) References Cited

U.S. PATENT DOCUMENTS

| | | | | |
|---|---|---|---|---|
| 6,068,094 | A * | 5/2000 | Takahashi | C22C 32/0089 188/251 M |
| 2003/0099853 | A1* | 5/2003 | Takayama | F16C 33/121 75/231 |
| 2014/0109723 | A1* | 4/2014 | Ishimoto | C22C 32/00 75/231 |

FOREIGN PATENT DOCUMENTS

| | | | |
|---|---|---|---|
| JP | 10226842 | A | 8/1998 |
| JP | 2012207289 | A | 10/2012 |

* cited by examiner

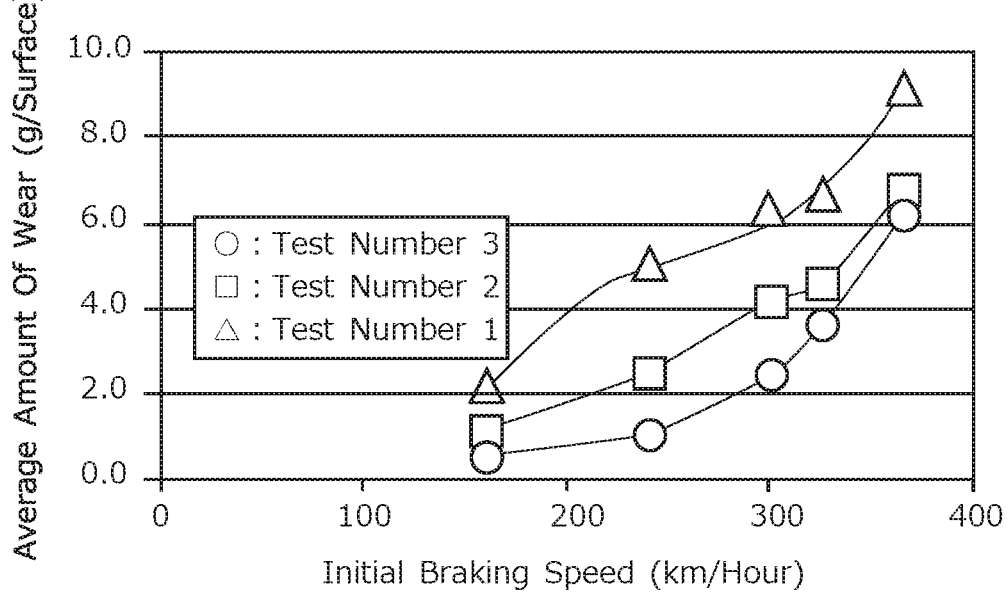

SINTERED FRICTION MATERIAL FOR RAILWAY VEHICLES AND METHOD FOR PRODUCING THE SAME

This is a National Phase Application filed under 35 U.S.C. § 371, of International Application No. PCT/JP2017/043148, filed Nov. 30, 2017, the contents of which are incorporated by reference.

TECHNICAL FIELD

The present invention relates to a sintered friction material and a method for producing the same, and more particularly to a sintered friction material for railway vehicles used for railway and a method for producing the same.

BACKGROUND ART

A brake lining and a disc brake pad for railway vehicles use a sintered friction material formed by sintering metal particulates or any other substance. The sintered friction material for railway vehicles requires excellent frictional properties and excellent wear resistance.

Japanese Patent Application Publication No. 05-86359 (Patent Literature 1), Japanese Patent Application Publication No. 10-226842 (Patent Literature 2), and Japanese Patent Application Publication No. 2012-207289 (Patent Literature 3) propose technologies for increasing the wear resistance of a sintered friction material.

A dry friction material disclosed in Patent Literature 1 has a matrix component made of Cu or Cu to which one or more selected from Sn, Zn, Ni, Fe, and Co are added, a hard particle component made of one or more selected from a metal oxide, a metal composite oxide, a metal nitride, a metal carbide, a metal carbo-nitride, a metal boride, an inter-metal compound, and a variety of minerals having a Mohs hardness of 3.5 or more, and a lubricant component made of one or more selected from graphite, coke, BN, a metal sulfide, $CaF_2$, $BaF_2$, PbO, Pb, and $B_2O_3$, with one or more selected from W, Mo, Nb, Ta, and Zr so added to the dry friction material that the added components account for 0.5 to 30 vol %, the hard particle component accounts for 2 to 30 vol %, the lubricant component accounts for 10 to 70 vol %, and the balance accounts for 10 to 70 vol %.

The metallic friction material disclosed in Patent Literature 2 is a sintered friction material formed of a metal material as a matrix to which at least a friction adjuster and a solid lubricant are added, with the mixture undergoing solid-phase sintering. In the sintered friction material, the metal material that forms the matrix contains Cu and Ni as primary components, and the friction adjuster and the solid lubricant are each a particulate having a particle diameter ranging from 10 to 300 μm, and the ratio of the overall particulates to the entire sintered friction material ranges from 15 to 50% (weight %, the same holds true for % in the following description).

The sintered friction material for high-speed railway disclosed in Patent Literature 3 contains, in mass %, 7.5% or more of Fe, 50% or more of Cu, 5 to 15% of graphite, 0.3 to 7% of molybdenum disulfide, and 0.5 to 10% of silica with Fe/Cu ranging from 0.15 to 0.40.

CITATION LIST

Patent Literature

Patent Literature 1: Japanese Patent Application Publication No. 05-86359

Patent Literature 2: Japanese Patent Application Publication No. 10-226842

Patent Literature 3: Japanese Patent Application Publication No. 2012-207289

SUMMARY OF INVENTION

Technical Problem

Japanese Shinkansen, Germany ICE (Intercity-Express), French TGV (Train a Grande Vitesse), and other high-speed railway vehicles each travel at a speed ranging from 0 to 70 km/hour as a low speed range, more than 70 to 170 km/hour as a medium speed range, and more than 170 km/hour and even 280 km/hour or more as a high speed range. The sintered friction material for railway vehicles therefore requires excellent frictional properties and wear resistance not only in the low to medium speed ranges but also in the high speed range.

In Patent Literatures 1 and 2, the initial braking speed in the brake test is 220 km/hour or less, and no study has been made at an initial braking speed of 280 km/hour or more. The sintered friction materials disclosed in Patent Literatures 1 and 2 are therefore likely to have poor frictional properties and small wear resistance in the high speed range.

In the case of the sintered friction material for high-speed railway disclosed in Patent Literature 3, frictional properties and wear resistance in the high speed range have been studied. However, more excellent frictional properties and wear resistance are required.

An objective of the present disclosure is to provide a sintered friction material for railway vehicles that has excellent wear resistance not only in the low to medium speed ranges but also in the high speed range of 280 km/hour or more and also provides sufficient frictional properties.

Solution to Problem

A sintered friction material for railway vehicles according to the present disclosure is a sintered material of a green compact, the green compact containing, in mass %, Cu: 50.0 to 75.0%, graphite: 5.0 to 15.0%, one or more selected from the group consisting of magnesia, zircon sand, silica, zirconia, mullite, and silicon nitride: 1.5 to 15.0%, one or more selected from the group consisting of W and Mo: 3.0 to 30.0%, and one or more selected from the group consisting of ferrochromium, ferrotungsten, ferromolybdenum, and stainless steel: 2.0 to 20.0%, with the balance being impurities.

A method for producing the sintered friction material for railway vehicles according to the present disclosure includes a forming step of producing the green compact by causing mixed powder described above to undergo cold forming and a pressure sintering step of performing pressure sintering on the green compact at a sintering temperature ranging from 800 to 1000° C. to produce the sintered friction material for railway vehicles.

Advantageous Effects of Invention

The sintered friction material for railway vehicles according to the present disclosure has excellent wear resistance not only in the low to medium speed ranges but also in the high speed range of 280 km/hour or more and also provides sufficient frictional properties.

BRIEF DESCRIPTION OF DRAWINGS

FIG. 3 shows the relationship between the initial braking speed (km/hour) and an average amount of wear (g/surface) in Example.

DESCRIPTION OF EMBODIMENTS

Figure 1:
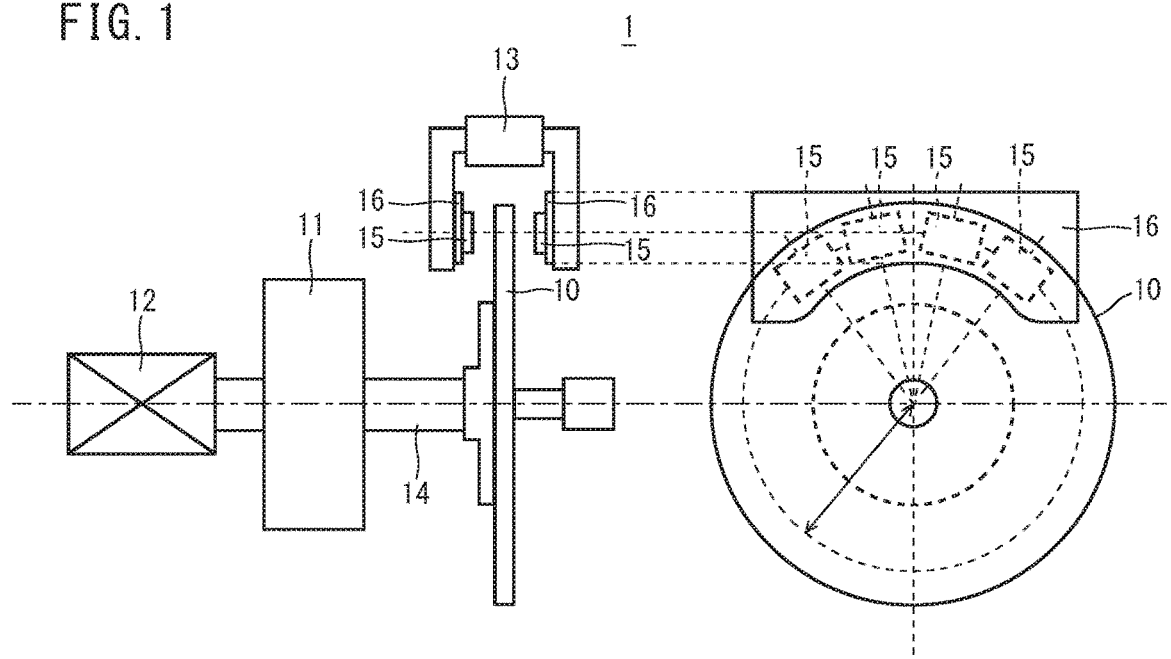
FIG. 1 is a diagrammatic view of a bench tester used in a brake test.

The present inventors have investigated and studied the frictional properties and wear resistance not only in the low to medium speed ranges but also in the high speed range of 280 km/hour or more. As a result, the present inventors have found that excellent frictional properties and wear resistance not only in the low to medium speed ranges but also in the high speed range of 280 km/hour or more are provided by a sintered friction material formed by sintering a green compact containing (1) Cu as the matrix component with no Ni, Sn, or Zn, (2) one or more selected from the group consisting of ferrochromium, ferrotungsten, ferromolybdenum, and stainless steel, and (3) one or more selected from the group consisting of W and Mo by using a well-known production method (pressure sintering) under well-known production conditions.

A sintered friction material for railway vehicles according to the present embodiment attained based on the findings described above is a sintered material of a green compact, the green compact containing in mass %, Cu: 50.0 to 75.0%, graphite: 5.0 to 15.0%, one or more selected from the group consisting of magnesia, zircon sand, silica, zirconia, mullite, and silicon nitride: 1.5 to 15.0%, one or more selected from the group consisting of W and Mo: 3.0 to 30.0%, and one or more selected from the group consisting of ferrochromium, ferrotungsten, ferromolybdenum, and stainless steel: 2.0 to 20.0%, with the balance being impurities.

The sintered friction material for railway vehicles according to the present embodiment is a sintered material formed by causing the green compact to undergo pressure sintering at a temperature ranging from 800 to 1000° C.

In the sintered friction material for railway vehicles according to the present embodiment, when a brake material is tested, for example, under the conditions: a brake disc having a diameter of 400 mm and a thickness of 20 mm, having the chemical composition corresponding to SCM440 specified in JIS G 4053 (2016), and having a tensile strength of about 1000 MPa and a caliper that brakes the brake disc are prepared; four sintered friction materials each having a width of 38 mm, a length of 55 mm, and a height of 15 mm are arranged on each of the right and left inner surfaces of the caliper in the form of a single line along an imaginary circle having a radius of 170 mm around the center of the brake disc 10 at angular intervals of 25° around the center axis of the brake disc; and the sintered friction materials attached to the right and left inner surfaces of the caliper are pressed against the opposite surfaces of the rotating brake disc at a fixed pressure of 2.24 kN, the average friction coefficient of the sintered friction materials at an initial braking speed of 365 km/hour is 0.280 or more; and the average amount of wear of the sintered friction materials per surface of the brake disc is 6.30 g/surface or less at an initial braking speed of 300 km/hour, 6.50 g/surface or less at an initial braking speed of 325 km/hour, and 9.00 g/surface or less at the initial braking speed of 365 km/hour. The term "about 1000 MPa," which is the tensile strength of the brake disc, means a range of 1000±20 MPa.

The sintered friction material for railway vehicles according to the present embodiment is a sintered material, as described above. It is very difficult to specify, for example, in the form of exact numerals, the chemical configuration (chemical composition) and the physical configuration of the sintered material, such as component analysis of the sintered material itself, the neck thickness, the bonding state (fused state) between powder particles, and dispersion situation of air cavities in the sintered material, by using the current measurement and analysis technologies. The sintered friction material for railway vehicles according to the present embodiment is therefore specified, for example, by the configuration of the green compact, the sintering temperature in the pressure sintering, the mechanical properties of the sintered friction material (average friction coefficient, average amount of wear), as described above. A method for producing the sintered friction material for railway vehicles according to the present embodiment is a well-known method, as will be described later. That is, the sintered friction material for railway vehicles according to the present embodiment is characterized by the composition of the green compact.

In the sintered friction material for railway vehicles according to the present embodiment, the green compact described above may contain, in place of part of Cu, one or more selected from the group consisting of hexagonal boron nitride: 3.0% or less, molybdenum disulfide: 3.0% or less, mica: 3.0% or less, one or more selected from iron sulfide, copper sulfide, and copper matte: 10.0% or less, vanadium carbide: 5.0% or less, and Fe: 20.0% or less.

The method for producing the sintered friction material for railway vehicles according to the present embodiment includes a forming step of producing a green compact by causing the mixed powder described above to undergo cold forming and a pressure sintering step of performing pressure sintering on the green compact at a sintering temperature ranging from 800 to 1000° C. to produce the sintered friction material for railway vehicles.

The sintered friction material for railway vehicles according to the present invention will be described below in detail.

[Chemical Composition]

The sintered friction material for railway vehicles according to the present invention is used as the material of a brake lining and a disc brake pad for railway vehicles, as described above. The pre-sintering green compact that forms the sintered friction material has the following composition (containing particulate for matrix, dispersant). The green compact is formed by causing the mixed powder to undergo cold forming in a press machine. Each particle of the mixed powder, which is the raw material of the green compact, does not necessarily have a specific particle diameter and ranges, for example, 1 to 1000 μm. The composition of the mixed powder that forms the green compact will be described below. The unit "%" associated with the composition of the mixed powder that forms the green compact means mass %.

[Particulate Material for Matrix (Base Material)]

Cu: 50.0 to 75.0%

Copper (Cu) functions as a matrix (base material) of the sintered friction material for railway vehicles. Cu has high thermal conductivity. An increase in temperature of the interface between a braking target member (such as brake disc) and the sintered friction material at the time of braking (when friction occurs) can therefore be suppressed, whereby occurrence of excessive seizure is avoided. The wear resistance of the sintered friction material therefore increases. Cu, which forms the matrix, further holds the dispersant (lubricant, hard particles), which is contained in the matrix and will be described later. If the Cu content in the mixed powder group is less than 50.0%, the effect described above is not provided. On the other hand, the Cu content is more than 75.0%, the friction coefficient excessively increases. In this case, friction due to adhesion to the sliding surface of the braking target (brake disc, for example) excessively occurs, resulting in a decrease in the wear resistance of the sintered friction material. The Cu content therefore ranges from 50.0 to 75.0%. A preferable lower limit of the Cu content is 52.0%, more preferably 53.0%. A preferable upper limit of the Cu content is 70.0%, more preferably 67.0%.

The sintered friction material for railway vehicles according to the present invention contains no Ni, Zn, or Sn in principle as part of the matrix. The phrase "contains no Ni, Zn, or Sn in principle" means that no Ni, Zr, or Sn is actively added, which means that Ni, Zr, and Sn are impurities.

Ni dissolves in Cu, and the matrix of the sintered friction material therefore tends to adhere to the sliding surface of the braking target (such as brake disc), resulting in a decrease in the wear resistance. Zn and Sn lower the heat resistance of the matrix and therefore tend to cause fading to occur. The matrix of the sintered friction material therefore contains no Ni, Zn, or Sn in principle.

[Dispersant]

The green compact described above further contains the following dispersants (1) to (4):

(1) Graphite: 5.0 to 15.0%

The graphite described in the present specification includes natural graphite and/or artificial graphite. In the sintered friction material after the pressure sintering, the matrix contains the graphite in the form of particles. The graphite functions as a lubricant, stabilizes the friction coefficient of the sintered friction material, and reduces the amount of wear of the sintered friction material. If the graphite content is less than 5.0%, the effect described above is not provided. On the other hand, if the graphite content is more than 15.0%, the mixed powder is not sufficiently sintered in the pressure sintering, resulting in a decrease in the wear resistance of the sintered friction material. The graphite content therefore ranges from 5.0 to 15.0%. A preferable lower limit of the graphite content is 8.0%, more preferably 9.0%. A preferable upper limit of the graphite content is 13.0%, more preferably 12.0%.

(2) One or more selected from the group consisting of magnesia, zircon sand, silica, zirconia, mullite, and silicon nitride: 1.5 to 15.0%

Magnesia (MgO), zircon sand ($ZrSiO_4$), silica ($SiO_2$), zirconia ($ZrO_2$), mullite ($3Al_2O_3 \cdot 2SiO_2$ to $2Al_2O_3 \cdot SiO_2$), and silicon nitride ($Si_3N_4$) each function as hard particles. In the sintered friction material after the pressure sintering, the matrix contains these ceramic materials in the form of particles. These ceramic materials each scratch the sliding surface of the braking target (such as brake disc) to remove an oxide film produced on the sliding surface for stable adhesion. A decrease in the friction coefficient of the sintered friction material against the braking target (such as brake disc) can thus be suppressed, whereby excellent frictional properties are achieved. If the total content of one or more selected from the group consisting of these ceramic materials is less than 1.5%, no excellent frictional properties are achieved. On the other hand, if the total content of one or more selected from the group consisting of these ceramic materials is more than 15.0%, the sinterability of the sintered friction material decreases. In this case, the wear resistance of the sintered friction material decreases. The total content of one or more selected from the group consisting of these ceramic materials therefore ranges from 1.5 to 15.0%. A preferable lower limit of the total content of one or more selected from the group consisting of these ceramic materials is 2.0%, more preferably 4.0%. A preferable upper limit of the total content of one or more selected from the group consisting of these ceramic materials is 12.0%, more preferably 10.0%.

(3) One or more selected from the group consisting of W and Mo: 3.0 to 30.0%

Tungsten (W) and molybdenum (Mo) each function as the hard particles. W and Mo do not dissolve in Cu, which forms the matrix, but are contained in the form of particles in the matrix. W and Mo are each contained along with Fe-based alloy particles, which will be described later, to increase the wear resistance of the sintered friction material. If the total content of one or more selected from the group consisting of W and Mo is less than 3.0%, the effect described above is not achieved. On the other hand, if the total content of one or more selected from the group consisting of W and Mo is more than 30.0%, the sinterability of the sintered friction material decreases. In this case, the wear resistance of the sintered friction material decreases. The total content of one or more selected from the group consisting of W and Mo therefore ranges from 3.0 to 30.0%. A preferable lower limit of the total content of one or more selected from the group consisting of W and Mo is 3.5%, more preferably 4.0%. A preferable upper limit of the total content of one or more selected from the group consisting of W and Mo is 25.0%, more preferably 20.0%.

(4) One or more selected from the group consisting of ferrochromium, ferrotungsten, ferromolybdenum, and stainless steel: 2.0 to 20.0%

Ferrochromium (FeCr), ferrotungsten (FeW), ferromolybdenum (FeMo), and stainless steel each do not dissolve in the matrix but are contained in the form of particles in the matrix. In the present specification, ferrochromium, ferrotungsten, ferromolybdenum, and stainless steel are collectively called Fe-based alloy particles. The Fe-based alloy particles each increase the wear resistance of the sintered friction material. The reason for this is uncertain, and the following reasons are conceivable:

The Fe-based alloy particles have hardness higher than that of the matrix (Cu). The Fe-based alloy particles further have high affinity with the matrix as compared with the ceramic materials described above (magnesia, zircon sand, silica, zirconia mullite, and silicon nitride) and are therefore unlikely to peel off the matrix. The Fe-based alloy particles therefore increase the wear resistance of the sintered friction material. The effect is further enhanced when the matrix contains the Fe-based alloy particles along with one or more selected from the group consisting of W and Mo. It is believed that the Fe-based alloy particles increase the wear resistance particularly in the low to medium speed ranges and W and Mo increase the wear resistance particularly in the high speed range.

If the total content of the Fe-based alloy particles is less than 2.0%, the wear resistance of the sintered friction material decreases. On the other hand, if the total content of the Fe-based alloy particles is more than 20.0%, the sinterability of the sintered friction material decreases. In this case, the wear resistance of the sintered friction material decreases. The total content of the Fe-based alloy particles therefore ranges from 2.0 to 20.0%. A preferable lower limit of the total content of the Fe-based alloy particles is 3.0%, more preferably 4.0%. A preferable upper limit of the total content of the Fe-based alloy particles is 18.0%, more preferably 16.0%.

In the present specification, the ferrochromium includes one or more selected from the group consisting of high-carbon ferrochromium (FCrH0, FCrH1, FCrH2, FCrH3, FCrH4, and FCrH5), medium-carbon ferrochromium (FCrM3 and FCrM4), and low-carbon ferrochromium (FCrL1, FCrL2, FCrL3, and FCrL4) specified in JIS G 2303 (1998).

In the present specification, the ferrotungsten means ferrotungsten (FW) having the chemical composition specified in JIS G 2306 (1998).

In the present specification, the ferromolybdenum includes one or more selected from the group consisting of high-carbon ferromolybdenum (FMoH) and low-carbon ferromolybdenum (FMoL) specified in JIS G 2307 (1998).

In the present specification, the stainless steel means an alloy steel containing 50 mass % or more of Fe and 10.5% or more of chromium. More preferably, the stainless steel in the present specification means stainless steel specified in JIS G 4303 (2012), JIS G 4304 (2012), JIS G 4304 (2015), JIS G 4305 (2012), JIS G 4305 (2015), JIS G 4308 (2013), and JIS G 4309 (2013). The stainless steel in the present specification may, for example, be martensite-based stainless steel, ferrite-based stainless steel, austenite-based stainless steel, duplex (austenite/ferrite-based) stainless steel, or precipitation-hardening-based stainless steel specified in JIS G 4304 (2012) described above.

The martensite-based stainless steel is, for example, SUS403, SUS410, SUS410S, SUS420 (SUS420J1, SUS420J2), or SUS440A specified in the JIS standards described above.

The ferrite-based stainless steel is, for example, SUS405, SUS410L, SUS429, SUS430, SUS430LX, SUS430J1L, SUS434, SUS436L, SUS436J1L, SUS443J1, SUS444, SUS445J1, SUS445J2, SUS447J1, or SUSXM27 specified in the JIS standards described above.

The austenite-based stainless steel is, for example, SUS301, SUS301L, SUS301J1, SUS302B, SUS303, SUS304, SUS304Cu, SUS304L, SUS304N1, SUS304N2, SUS304LN, SUS304J1, SUS304J2, SUS305, SUS309S, SUS310S, SUS312L, SUS315J1, SUS315J2, SUS316, SUS316L, SUS316N, SUS316LN, SUS316Ti, SUS316J1, SUS316J1L, SUS317, SUS317L, SUS317LN, SUS317J1, SUS317J2, SUS836L, SUS890L, SUS321, SUS347, SUSXM7, or SUSXM15J1 specified in the JIS standards described above.

The duplex (austenite/ferrite-based) stainless steel is, for example, SUS821L1, SUS323L. SUS329J1, SUS329J3L, SUS329J4L, or SUS327L1 specified in the JIS standards described above.

The precipitation-hardening-based stainless steel is, for example, SUS630 or SUS631 specified in the JIS standards described above.

The balance of the green compact for the sintered friction material is impurities. The impurities used herein mean impurities that enter from the raw material or a production environment when the green compact is industrially produced and are permitted to the extent that the impurities do not adversely affect the sintered friction material according to the present embodiment.

[Optional Additives]

The green compact described above may contain, in place of part of Cu, one or more selected from the group consisting of the following substances (5) to (7):

(5) One or more selected from the group consisting of (a) to (d) described below:
(a) hexagonal boron nitride: 3.0% or less;
(b) molybdenum disulfide: 3.0% or less;
(c) mica: 3.0% or less; and
(d) one or more selected from iron sulfide, copper sulfide, and copper matte: 10.0% or less The hexagonal boron nitride (h-BN), the molybdenum disulfide ($MoS_2$), mica, and one or more selected from iron sulfide, copper sulfide, and copper matte each function as a lubricant. The lubricants described above stabilize the friction coefficient of the sintered friction material and provides excellent frictional properties, as does graphite. If the content of any of the lubricants is more than 3.0%, however, the sinterability of the sintered friction material decreases, and the wear resistance thereof decreases accordingly. Therefore, the content of the hexagonal boron nitride is 3.0% or less, the content of the molybdenum disulfide is 3.0% or less, the content of the mica is 3.0% or less, and the total content of one or more selected from iron sulfide, copper sulfide, and copper matte is 10.0% or less.

The copper matte is described as the number 5400 in the copper product terms in JIS H 0500 (1998) and is primarily made of iron sulfide and copper sulfide. The iron sulfide and copper sulfide each act by itself as the lubricant. The iron sulfide and copper sulfide may be mixed with each other before used. The copper matte described above can be used as the mixture of iron sulfide and copper sulfide and is inexpensive. The copper matte is therefore advantageous from the economic viewpoint.

(6) Vanadium carbide: 5.0% or less

A vanadium carbide (VC) is hard particles and contained in the form of particles in the matrix. A synergetic effect provided by a vanadium carbide and W further increases the wear resistance of the sintered friction material. If the content of the vanadium carbide is too large, however, the sinterability of the sintered friction material decreases, and the wear resistance thereof decreases accordingly. The content of the vanadium carbide is therefore 5.0% or less. A preferable lower limit of the content of the vanadium carbide is 0.2%, more preferably 0.5%. A preferable upper limit of the content of the vanadium carbide is 4.0%, more preferably 3.0%.

(7) Fe: 20.0% or less

Iron (Fe) is contained in the form of particles in the matrix of the sintered friction material or in the form of agglomerate in the sintered friction material. Fe increases the strength of the matrix and the wear resistance of the sintered friction material. Fe further increases the friction coefficient of the sintered friction material through seizure. If the Fe content is too large, however, adhesion is likely to occur, so that the wear resistance of the sintered friction material decreases. The content of Fe is therefore 20.0% or less. A preferable lower limit of the Fe content is 0.5%, more preferably 4.0%. A preferable upper limit of the Fe content is 15.0%, more preferably 12.0%.

[Sintered Friction Material]

The sintered friction material according to the present embodiment is formed by causing the green compact described above to undergo pressure sintering by using a well-known pressure sintering method under well-known pressure sintering conditions. More specifically, the sintered friction material according to the present embodiment is formed by causing the green compact described above to undergo pressure sintering at a temperature ranging from 800 to 1000° C. The sintered friction material according to the present embodiment particularly contains (1) to (4) described above in the matrix made of Cu and further optionally contains at least one or more of (5) to (7) to achieve sufficient frictional properties and excellent wear resistance, particularly excels in wear resistance in the high speed range of 280 km/hour or more.

More specifically, in the sintered friction material according to the present embodiment, when the sintered friction material is tested under the conditions: a brake disc having a diameter of 400 mm and a thickness of 20 mm, having the chemical composition corresponding to SCM440 specified in JIS G 4053 (2016), and having a tensile strength of about 1000 MPa and a caliper that brakes the brake disc are prepared; four sintered friction material members each having a width of 38 mm, a length of 55 mm, and a height of 15 mm are arranged on each of the right and left inner surfaces of the caliper in the form of a single line along an imaginary circle having a radius of 170 mm around the center of the brake disc 10 at angular intervals of 25° around the center axis of the brake disc 10; and the sintered friction material members attached to the right and left inner surfaces of the caliper are pressed against the opposite surfaces of the rotating brake disc at a fixed pressure of 2.24 kN, the average friction coefficient of the sintered friction material at an initial braking speed of 365 km/hour is 0.280 or more; and the average amount of wear of the sintered friction material per surface of the brake disc is 6.30 g/surface or less at an initial braking speed of 300 km/hour, 6.50 g/surface or less at an initial braking speed of 325 km/hour, and 9.00 g/surface or less at the initial braking speed of 365 km/hour.

Preferably, in the sintered friction material according to the present embodiment, when the brake test described above is performed, the average friction coefficient at the initial braking speed of 365 km/hour is preferably 0.285 or more, more preferably 0.290 or more, still more preferably 0.300 or more.

Preferably, in the sintered friction material according to the present embodiment, when the brake test described above is performed, the average amount of wear at the initial braking speed of 300 km/hour is preferably 5.50 g/surface or less, more preferably 5.00 g/surface. The average amount of wear at the initial braking speed of 325 km/hour is preferably 5.70 g/surface or less, more preferably 5.20 g/surface. The average amount of wear at the initial braking speed of 365 km/hour is preferably 8.50 g/surface or less, more preferably 8.00 g/surface.

[Production Method]

An example of the method for producing the sintered friction material according to the present invention will be described. The example of the method for producing the sintered friction material according to the present invention includes a mixed powder producing step, a forming step, and a pressure sintering step. The steps will each be described below.

[Mixed Powder Producing Step]

(1) to (4) described above in the form of particulates are prepared, and (5) to (7) in the form of particulates are also prepared as required. The prepared particulates are mixed with one another by using a well-known mixer to produce mixed powder. The well-known mixer is, for example, a ball mill or a V-shaped mixer.

[Forming Step]

The produced mixed powder is caused to undergo cold forming into a predetermined shape to produce a green compact. A well-known forming method may be applied to the formation of the mixed powder. For example, a press forming method may be used to produce the green compact described above. Specifically, a die for forming the predetermined shape is prepared. The die is filled with the mixed powder. The particulates with which the die is filled are pressurized by a press machine at well-known pressure to undergo cold forming into a green compact. Since cold forming is used, the green compact is typically formed at normal temperature. The pressure applied by the press machine is, for example, 180 N/mm$^2$ or more, preferably 196 N/mm$^2$ or more. The upper limit of the pressure applied by the press machine is, for example, 1000 N/mm$^2$. It is sufficient to perform the formation in the atmosphere.

[Pressure Sintering Step]

A well-known pressure sintering method is performed on the produced green compact to produce the sintered friction material. For example, the green compact is placed on a graphite plate in a pressure sintering apparatus. Thereafter, the graphite plates on each of which the green compact has been placed are stacked on each other and stored in an enclosure-shaped frame having an inner peripheral surface on which a high-frequency heating coil is disposed. The green compacts are then sintered at a predetermined sintering temperature in a sintering atmosphere with the uppermost graphite plate pressurized to pressurize the green compacts.

It is sufficient to perform the pressure sintering under well-known conditions. The sintering temperature in the pressure sintering ranges, for example, from 800 to 1000° C. The lower limit of the sintering temperature is preferably 820° C., more preferably 830° C., still more preferably 840° C. The upper limit of the sintering temperature is preferably 980° C., more preferably 970° C., still more preferably 960° C.

The pressure applied to the green compacts in the pressure sintering ranges, for example, from 0.2 to 5.0 N/mm$^2$. The lower limit of the pressure applied to the green compacts in the pressure sintering is preferably 0.3 N/mm$^2$, more preferably 0.4 N/mm$^2$, still more preferably 0.5 N/mm$^2$. The upper limit of the pressure applied to the green compacts in the pressure sintering is preferably 4.0 N/mm$^2$, more preferably 3.0 N/mm$^2$, still more preferably 1.5 N/mm$^2$.

The period for which the sintering temperature described above is maintained in the pressure sintering ranges from 10 to 120 minutes. The lower limit of the sintering temperature maintaining period is preferably 20 minutes, more preferably 60 minutes. The upper limit of the sintering temperature maintaining period is preferably 110 minutes, more preferably 100 minutes.

The atmosphere in the pressure sintering is formed, for example, of an inert gas and impurities or an inert gas and H$_2$ gas with the balance being impurities. In the case where the atmosphere contains H$_2$ gas, a preferable content of the H$_2$ gas ranges from 5 to 20%6. The inert gas is, for example, N$_2$ gas or Ar gas. A preferable atmosphere in the pressure sintering contains 5 to 20% of H$_2$ gas and the balance contains N$_2$ and impurities. Instead, the preferable atmosphere in the pressure sintering is formed of Ar gas and impurities.

The pressure sintering described above forms a neck in a contact portion between the particulates in each of the green compacts. The sintered friction material described above is thus produced.

[Other Steps]

The production method described above may further include a well-known coining step and/or a well-known cutting step.

[Coining Step]

The coining step may be carried out after the pressure sintering step. In the coining step, the sintered friction material after the pressure sintering step is caused to undergo cold pressurization. The sintered friction material is thus shaped.

[Cutting Step]

The cutting step may be carried out after the pressure sintering step or the coining step. In the cutting step, the sintered friction material is cut into a desired shape.

The sintered friction material for railway vehicles according to the present invention is produced by carrying out the production steps described above. In the case where the sintered friction material for railway vehicles is used to form a brake lining, one or more sintered friction material members are fixed to an attachment plate member, and the resultant structure is attached to the railway vehicle.

EXAMPLE

Several types of mixed powder containing the particulates shown in Table 1 were produced.

TABLE 1

| Components (Unit: mass %, balance contains impurities) | | | | | | | | | | |
|---|---|---|---|---|---|---|---|---|---|---|
| | | Graphite | | | | | | | | |
| Test number | Cu | Artificial graphite | Natural graphite | Magnesia | Zircon sand | Silica | Zirconia | Mullite | Silicon nitride | Mo | W |
| 1 | 67.0 | 11.0 | 0.50 | — | 5.0 | 1.50 | — | — | — | — | — |
| 2 | 60.3 | 9.9 | 0.45 | — | 4.5 | 1.35 | — | — | — | — | 10.0 |
| 3 | 53.6 | 8.8 | 0.40 | — | 4.0 | 1.20 | — | — | — | — | 20.0 |
| 4 | 55.5 | 10.0 | 0.50 | — | 4.5 | 0.50 | — | — | — | — | 10.0 |
| 5 | 56.3 | 10.6 | 0.50 | — | 3.8 | 1.10 | — | — | — | — | 10.0 |
| 6 | 53.1 | 11.0 | 0.50 | — | 6.0 | 1.20 | — | 1.6 | — | — | 10.0 |
| 7 | 60.2 | 11.1 | 0.50 | — | 4.6 | 1.40 | — | — | — | — | 10.0 |
| 8 | 54.4 | 9.7 | — | — | 3.1 | 1.30 | — | 1.6 | 3.1 | — | 10.0 |

| Components (Unit: mass %, balance contains impurities) | | | | | | | | | | |
|---|---|---|---|---|---|---|---|---|---|---|
| Test number | Ferrochromium | Ferrotungsten | Ferromolybdenum | SUS316L | BN | MoS$_2$ | Mica | Copper matte | VC | Fe |
| 1 | 5.0 | — | — | — | — | — | — | — | — | 10.0 |
| 2 | 4.5 | — | — | — | — | — | — | — | — | 9.0 |
| 3 | 4.0 | — | — | — | — | — | — | — | — | 8.0 |
| 4 | 8.0 | — | — | — | — | — | — | 5.0 | 2.0 | 4.0 |
| 5 | 3.6 | — | — | — | — | — | — | 5.0 | 2.0 | 7.1 |
| 6 | 4.8 | — | — | 4.8 | — | — | — | 5.0 | 2.0 | — |
| 7 | 4.6 | 5.0 | — | — | 0.6 | — | — | — | 2.0 | — |
| 8 | 4.7 | 5.0 | — | 4.7 | — | — | 0.4 | — | 2.0 | — |

Specifically, the raw material was injected into the V-shaped mixer and mixed for 20 to 100 minutes at a rotary speed ranging from 20 to 40 rpm to produce the mixed powder labeled with each of the test numbers.

The several types of mixed powder having the respective test numbers were used to produce green compacts in cold forming. In the formation, a die made of a hard metal was filled with each of the several types of mixed powder, the mixed powder was then pressurized at pressure ranging from 196 to 588 N/mm$^2$ to form a green compact at normal temperature (25° C.).

The green compacts were each pressurized and sintered in the pressure sintering method to form a sintered friction material. Specifically, the green compacts are placed on graphite plates. Thereafter, the graphite plates on which the green compacts have been placed are stacked on each other and stored in an enclosure-shaped frame having an inner peripheral surface on which a high-frequency heating coil is disposed. The green compacts were heated for 60 minutes at a temperature ranging from 850 to 950° C. and pressurized at pressure ranging from 0.5 to 1.0 N/mm$^2$ to sinter the green compacts to produce the sintered friction materials. The atmosphere in the frame during the pressure sintering was a gaseous mixture formed of 5 to 10% of H$_2$ gas and N$_2$ gas. The sintered friction materials were produced by carrying out the production steps described above.

[Brake Test]

The produced sintered friction materials were used to perform a brake test. Specifically, a bench tester 1 shown in FIG. 1 was prepared. The bench tester 1 included a brake disc 10, which is a braking target, a flywheel 11, a motor 12, and a caliper 13. The brake disc 10 was connected to the flywheel 11 and the motor 12 via a shaft 14. The brake disc 10 was so sized as to be half of the brake disc used in Shinkansen, that is, has the diameter of 400 mm and the thickness of 20 mm. The brake disc, which is a braking target, had the chemical composition corresponding to SCM440 specified in JIS G 4053 (2016). The brake disc was so caused to undergo quenching and tempering that the tensile strength of the brake disc was adjusted to 1000 MPa.

Four sintered friction material members 15 (linings) were attached to an attachment plate 16. Two sets of the attachment plate 16 to which the four sintered friction material members 15 (linings) have been attached were prepared, and the attachment plates 16 were attached to the right and left inner surfaces of the caliper 13. The sintered friction material members 15 each had a box-like shape having the width of 38 mm, the length of 55 mm, and the height of 15 mm. The four sintered friction material members were arranged in the form of a single line along an imaginary circle having the radius of 170 mm around the center of the brake disc 10 at the angular intervals of 25° around the center axis of the brake disc 10.

[Measurement of Friction Coefficient in Brake Test]

After the attachment plates 16 to which the sintered friction material members 15 (linings) had been attached were attached to the caliper 13, the brake test was performed. Specifically, the sintered friction material members 15 attached to the right and left inner surfaces of the caliper 13 were pressed against the opposite surfaces of the brake disc, which is the rotating braking target, (the sintered friction material members 15 braked the brake disc) at the fixed pressure of 2.24 kN, and the torque was measured to determine the friction coefficient (p).

The speed of the disc brake at the start of the braking (initial braking speed) was set at 160, 240, 300, 325, and 365 km/hour, and the friction coefficient was determined at each of the initial braking speeds. At each of the initial braking speeds, the braking was performed three times to determine the friction coefficient, and the average of the three friction coefficient values was defined as the average friction coefficient at the initial braking speed.

[Amount of Wear in Brake Test]

The difference in mass of each of the sintered friction materials before and after the brake test performed at each of the initial braking speeds described above was determined, and an average amount of wear (g/surface) of the sintered friction material per surface of the brake disc in one brake test was determined from the determined mass difference. Specifically, the entire mass of the sintered friction material member 15 attached to the attachment plate 16 was measured before the test, the entire mass was measured in the same state after the three brake tests, and the mass difference was determined on a set basis. After the mass differences of the right and left sets were summed, the sum was divided by 3, which is the number of brake tests, and further divided by 2, which is the number of sets, and the quotient of the division was defined as the average amount of wear (g/surface) at the initial braking speed.

[Test Results]

Figure 2:
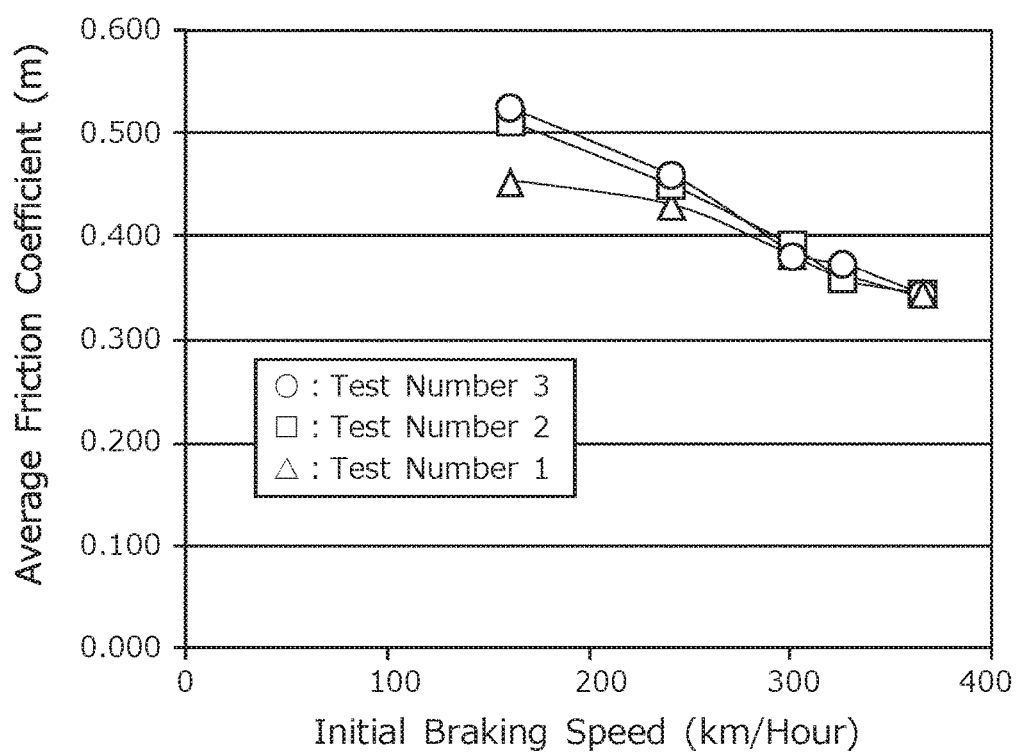
FIG. 2 shows the relationship between an initial braking speed (km/hour) and an average friction coefficient (t) in Example.

Table 2 shows the test results of test numbers 1 to 8. FIG. 2 shows the relationship between the initial braking speed (km/hour) and the friction coefficient (JA) for the test numbers 1 to 3. Further, FIG. 3 shows the relationship between the initial braking speed (km/hour) and the average amount of wear (g/surface) for the test numbers 1 to 3.

With reference to Table 2 and FIG. 2, large average friction coefficients of 0.280 or more were provided at any of the initial braking speeds.

Further, with reference to Table 2 and FIG. 3, the test numbers 2 to 8, in each of which the sintered friction material contains both the Fe-based alloy particles and W, provided small average amounts of wear (g/surface) at any of the initial braking speeds, as compared with the test number 1, in which the sintered friction material contains no W or Fe-based alloy particles. Further, as compared with the test numbers 2 to 8, the test number 3, which has a large W content, provided a relatively large friction coefficient and a relatively small average amount of wear, as compared with the other test numbers, in each of which the W content was less than the test number 3.

The embodiment of the present invention has been described. The embodiment described above is, however, merely an example of implementation of the present invention. The present invention is therefore not limited to the embodiment described above, and the embodiment described above can be changed as appropriate to the extent that the change does not depart from the substance of the present invention and implemented in the changed form.

The invention claimed is:

1. A sintered friction material for railway vehicles that is a sintered material of a green compact, the green compact containing in mass %:
    Cu, which forms a matrix of the sintered friction material: 50.0 to 75.0%;
    graphite: 5.0 to 15.0%;
    one or more selected from the group consisting of magnesia, zircon sand, silica, zirconia, mullite, and silicon nitride: 1.5 to 15.0%;
    one or more types selected from the group consisting of W particles and Mo particles: 10.0 to 30.0%; and

TABLE 2

| | | Average friction coefficient (μ) | | | | |
|---|---|---|---|---|---|---|
| Test number | W + Mo (mass %) | Initial braking speed of 160 km/hour | Initial braking speed of 240 km/hour | Initial braking speed of 300 km/hour | Initial braking speed of 325 km/hour | Initial braking speed of 365 km/hour |
| 1 | — | 0.454 | 0.431 | 0.383 | 0.364 | 0.346 |
| 2 | 10.0 | 0.513 | 0.451 | 0.394 | 0.360 | 0.347 |
| 3 | 20.0 | 0.526 | 0.461 | 0.381 | 0.374 | 0.346 |
| 4 | 10.0 | 0.473 | 0.414 | 0.351 | 0.313 | 0.287 |
| 5 | 10.0 | 0.485 | 0.428 | 0.403 | 0.367 | 0.296 |
| 6 | 10.0 | 0.413 | 0.360 | 0.307 | 0.291 | 0.297 |
| 7 | 10.0 | 0.545 | 0.521 | 0.456 | 0.433 | 0.386 |
| 8 | 10.0 | 0.493 | 0.394 | 0.337 | 0.337 | 0.325 |

| | Average amount of wear (g/surface) | | | | |
|---|---|---|---|---|---|
| Test number | Initial braking speed of 160 km/hour | Initial braking speed of 240 km/hour | Initial braking speed of 300 km/hour | Initial braking speed of 325 km/hour | Initial braking speed of 365 km/hour |
| 1 | 2.23 | 5.10 | 6.35 | 6.60 | 9.20 |
| 2 | 1.15 | 2.53 | 4.20 | 4.63 | 6.83 |
| 3 | 0.55 | 1.07 | 2.48 | 3.65 | 6.23 |
| 4 | 0.47 | 1.00 | 2.53 | 4.25 | 6.85 |
| 5 | 0.47 | 1.37 | 2.77 | 4.30 | 4.98 |
| 6 | 0.43 | 1.15 | 2.68 | 3.80 | 7.50 |
| 7 | 0.33 | 0.73 | 2.18 | 3.13 | 4.60 |
| 8 | 0.22 | 0.75 | 1.68 | 2.42 | 4.87 | one or more selected from the group consisting of ferrochromium, ferrotungsten, ferromolybdenum, and stainless steel: 2.0 to 20.0%, with the balance being impurities.

2. The sintered friction material for railway vehicles according to claim 1, wherein the sintered friction material for railway vehicles is a sintered material formed by causing the green compact to undergo pressure sintering at a temperature ranging from 800 to 1000° C.

3. The sintered friction material for railway vehicles according to claim 2, wherein the green compact further contains one or more selected from the group consisting of hexagonal boron nitride: 3.0% or less, molybdenum disulfide: 3.0% or less, mica: 3.0% or less, one or more selected from iron sulfide, copper sulfide, and copper matte: 10.0% or less, vanadium carbide: 5.0% or less, and Fe: 20.0% or less.

4. The sintered friction material for railway vehicles according to claim 1, wherein the green compact further contains one or more selected from the group consisting of hexagonal boron nitride: 3.0% or less, molybdenum disulfide: 3.0% or less, mica: 3.0% or less, one or more selected from iron sulfide, copper sulfide, and copper matte: 10.0% or less, vanadium carbide: 5.0% or less, and Fe: 20.0% or less.

5. A method for producing the sintered friction material for railway vehicles according to claim 1, the method comprising:

a forming step of producing the green compact by causing mixed powder to undergo cold forming; and a pressure sintering step of performing pressure sintering on the green compact at a sintering temperature ranging from 800 to 1000° C. to produce the sintered friction material for railway vehicles.

6. A sintered friction material for railway vehicles that is a sintered material of a green compact, the green compact containing in mass %:

Cu, which forms a matrix of the sintered friction material: 50.0 to 75.0%;

graphite: 5.0 to 15.0%;

one or more selected from the group consisting of magnesia, zircon sand, silica, zirconia, mullite, and silicon nitride: 1.5 to 15.0%;

one or more selected from the group consisting of W and Mo contained in the form of non-ferrous particles: 10.0 to 30.0%; and one or more selected from the group consisting of ferrochromium, ferrotungsten, ferromolybdenum, and stainless steel: 2.0 to 20.0%, with the balance being impurities.

\* \* \* \* \*